US010567493B2

(12) United States Patent
DiVincenzo et al.

(10) Patent No.: US 10,567,493 B2
(45) Date of Patent: Feb. 18, 2020

(54) INTELLIGENT PREDICTIVE STREAM CACHING

(71) Applicant: Verizon Digital Media Services Inc., Playa Vista, CA (US)

(72) Inventors: Jonathan DiVincenzo, Los Angeles, CA (US); Seungyeob Choi, Northridge, CA (US); Karthik Sathyanarayana, Los Angeles, CA (US); Robert J. Peters, Santa Monica, CA (US); Eric Dyoniziak, Streamwood, IL (US)

(73) Assignee: Verizon Digital Media Services Inc., Playa Vista, CA (US)

( * ) Notice: Subject to any disclaimer, the term of this patent is extended or adjusted under 35 U.S.C. 154(b) by 4 days.

(21) Appl. No.: 15/899,653

(22) Filed: Feb. 20, 2018

(65) Prior Publication Data
US 2018/0176297 A1 Jun. 21, 2018

Related U.S. Application Data

(63) Continuation of application No. 14/831,578, filed on Aug. 20, 2015, now Pat. No. 9,906,590.

(51) Int. Cl.
*H04L 29/08* (2006.01)
*H04N 21/845* (2011.01)
(Continued)

(52) U.S. Cl.
CPC ...... *H04L 67/1014* (2013.01); *H04L 67/1008* (2013.01); *H04L 67/2847* (2013.01);
(Continued)

(58) Field of Classification Search
CPC . H04L 67/2842; H04L 65/4084; H04L 67/02; H04L 67/2847; G06F 12/0862;
(Continued)

(56) References Cited

U.S. PATENT DOCUMENTS 6,463,508 B1 * 10/2002 Wolf .................. G06F 12/0888
711/130
6,578,102 B1 * 6/2003 Batchelor ........... G06F 13/4059
710/310
(Continued)

FOREIGN PATENT DOCUMENTS

WO WO-2013047207 A1 * 4/2013 ......... H04L 67/2842

*Primary Examiner* — Shean Tokuta
(74) *Attorney, Agent, or Firm* — Ansari Katiraei LLP; Arman Katiraei; Sadiq Ansari (57) ABSTRACT

Some embodiments provide intelligent predictive stream caching for live, linear, or video-on-demand streaming content using prefetching, segmented caching, and request clustering. Prefetching involves retrieving streaming content segments from an origin server prior to the segments being requested by users. Prefetching live or linear streaming content segments involves continually reissuing requests to the origin until the segments are obtained or a preset retry duration is completed. Prefetching is initiated in response to a first request for a segment falling within a particular interval. Request clustering commences thereafter. Subsequent requests are queued until the segments are retrieved. Segmented caching involves caching segments for one particular interval. Segments falling within a next interval are not prefetched until a first request for one such segment in the next interval is received. Cached segments from the previous interval can be replaced in cache with segments for the current interval, thereby minimizing cache footprint utilization.

17 Claims, 6 Drawing Sheets

(51) Int. Cl.
*H04N 21/2187* (2011.01)
*H04N 21/231* (2011.01)

(52) U.S. Cl.
CPC ... *H04N 21/2187* (2013.01); *H04N 21/23106* (2013.01); *H04N 21/8456* (2013.01); *H04L 67/02* (2013.01)

(58) Field of Classification Search
CPC .............. G06F 9/383; H04N 21/8456; H04N 21/23106; H04N 21/222
See application file for complete search history.

(56) References Cited

U.S. PATENT DOCUMENTS

| | | | | |
|---|---|---|---|---|
| 6,647,469 B1* | 11/2003 | Sharma | ............... | G06F 12/0817 711/141 |
| 7,286,548 B1* | 10/2007 | Jair | ............... | H04L 49/90 370/412 |
| 7,574,423 B2* | 8/2009 | Dettinger | ............... | G06F 16/2423 |
| 7,822,731 B1* | 10/2010 | Yu | ............... | G06F 12/0862 707/705 |
| 8,180,720 B1* | 5/2012 | Kovacs | ............... | H04L 67/2842 706/47 |
| 8,255,635 B2* | 8/2012 | Arimilli | ............... | G06F 12/0831 711/141 |
| 8,266,383 B1* | 9/2012 | Minkin | ............... | G06F 12/0859 710/39 |
| 8,370,460 B1* | 2/2013 | Khakpour | ............... | H04L 29/08729 709/203 |
| 8,429,351 B1* | 4/2013 | Yu | ............... | G06F 12/0862 711/132 |
| 8,990,420 B2* | 3/2015 | Glasser | ............... | H04L 67/1008 709/231 |
| 9,178,929 B2* | 11/2015 | Ma | ............... | H04L 65/608 |
| 9,363,308 B2* | 6/2016 | Sebastian | ............... | H04L 12/1859 |
| 9,430,240 B1* | 8/2016 | Atta | ............... | G06F 9/3851 |
| 9,438,675 B2* | 9/2016 | Baptist | ............... | H04L 67/1097 |
| 9,456,050 B1* | 9/2016 | Lepeska | ............... | H04L 67/2847 |
| 9,489,456 B1* | 11/2016 | Vidwans | ............... | G06F 16/183 |
| 9,601,126 B2* | 3/2017 | Owen | ............... | H04N 21/23406 |
| 9,609,340 B2* | 3/2017 | Brueck | ............... | H04N 19/40 |
| 2004/0078450 A1* | 4/2004 | Chen | ............... | H04L 67/2842 709/214 |
| 2007/0130585 A1* | 6/2007 | Perret | ............... | H04N 7/17318 725/46 |
| 2008/0155059 A1* | 6/2008 | Hardin | ............... | H04N 7/17336 709/218 |
| 2009/0010426 A1* | 1/2009 | Redmond | ............... | H04L 29/06027 380/29 |
| 2009/0113024 A1* | 4/2009 | Verma | ............... | H04L 29/06027 709/219 |
| 2010/0325303 A1* | 12/2010 | Wang | ............... | G06Q 30/06 709/231 |
| 2011/0252100 A1* | 10/2011 | Raciborski | ............... | H04L 67/06 709/206 |
| 2011/0252115 A1* | 10/2011 | Karlsson | ............... | H04L 65/602 709/217 |
| 2011/0296239 A1* | 12/2011 | Hsu | ............... | G06F 11/0709 714/16 |
| 2012/0072608 A1* | 3/2012 | Peters | ............... | H04L 65/4084 709/231 |
| 2012/0149346 A1* | 6/2012 | Akhtar | ............... | H04L 67/2847 455/414.2 |
| 2012/0320916 A1* | 12/2012 | Sebastian | ............... | H04N 21/2402 370/390 |
| 2013/0041972 A1* | 2/2013 | Field | ............... | H04L 29/08729 709/213 |
| 2013/0086478 A1* | 4/2013 | Gibby | ............... | G11B 27/034 715/738 |
| 2013/0179541 A1* | 7/2013 | Chen | ............... | H04L 65/4084 709/219 |
| 2013/0246555 A1* | 9/2013 | Harvell | ............... | H04L 67/2842 709/214 |
| 2014/0095592 A1* | 4/2014 | Hartrick | ............... | H04L 67/148 709/203 |
| 2014/0115089 A1* | 4/2014 | Maybee | ............... | G06F 16/24544 709/213 |
| 2014/0201472 A1* | 7/2014 | Joshua | ............... | G06F 12/0813 711/151 |
| 2014/0208426 A1* | 7/2014 | Natarajan | ............... | H04L 63/1416 726/23 |
| 2014/0258240 A1* | 9/2014 | Choi | ............... | H04L 65/4069 707/661 |
| 2014/0310478 A1* | 10/2014 | Dodson | ............... | G06F 12/0862 711/137 |
| 2014/0317356 A1* | 10/2014 | Srinivasan | ............... | G06F 12/0862 711/137 |
| 2014/0373032 A1* | 12/2014 | Merry | ............... | G06F 9/54 719/328 |
| 2015/0081906 A1* | 3/2015 | Backholm | ............... | H04W 74/06 709/225 |
| 2015/0127852 A1* | 5/2015 | Prieditis | ............... | H04L 67/2842 709/242 |
| 2015/0134846 A1* | 5/2015 | Bazar | ............... | H04L 65/608 709/231 |
| 2015/0134933 A1* | 5/2015 | Holm | ............... | G06F 12/0862 712/207 |
| 2015/0142928 A1* | 5/2015 | Fu | ............... | H04L 67/322 709/219 |
| 2015/0172066 A1* | 6/2015 | Gholmieh | ............... | H04L 12/189 370/312 |
| 2015/0319214 A1* | 11/2015 | Yu | ............... | H04L 65/4069 709/219 |
| 2015/0381756 A1* | 12/2015 | Lotfallah | ............... | H04L 67/2814 726/4 |
| 2016/0029402 A1* | 1/2016 | Backholm | ............... | H04W 76/10 370/329 |
| 2016/0134900 A1* | 5/2016 | Wei | ............... | H04N 21/222 725/32 |
| 2016/0182671 A1* | 6/2016 | Dakhane | ............... | H04L 65/605 709/219 |
| 2016/0241665 A1* | 8/2016 | Covell | ............... | H04L 67/10 |
| 2016/0283383 A1* | 9/2016 | Svendsen | ............... | G06F 12/0862 |
| 2017/0041422 A1* | 2/2017 | Westphal | ............... | H04L 67/2847 |
| 2017/0094710 A1* | 3/2017 | Nirantar | ............... | H04L 69/16 |

* cited by examiner

INTELLIGENT PREDICTIVE STREAM CACHING

CLAIM OF BENEFIT TO RELATED APPLICATIONS

This application is a continuation of U.S. nonprovisional patent application Ser. No. 14/831,578 entitled "Intelligent Predictive Stream Caching", filed Aug. 20, 2015. The contents of application Ser. No. 14/831,578 are hereby incorporated by reference.

BACKGROUND ART

Delivering streaming content, especially live or linear video content over a digital network to multiple users, is a difficult proposition. An end user experiences buffering and breaks in the streaming content playback if the streaming content segments are not routed fast enough to the end user or the responding server is too slow to respond to the user's requests. For simplicity, the terms live and linear will be used interchangeably hereafter and the term streaming content will be in reference to any of a linear content stream, a live content stream, or a video-on-demand (VOD) content stream.

A content provider publishes live streaming content to one or more origin servers. The origin servers become the point of origin for distribution of the streaming content across a digital network. In the case of VOD streaming, the content files are stored on storage devices attached to the origin servers. The origin servers can be quickly overwhelmed if having to redistribute the streaming content simultaneously to hundreds, if not thousands, of end users.

To avoid overwhelming the origin servers, the streaming content is typically fanned out from the origin server to other distribution servers that then distribute the streaming content to the end users. This distribution server hierarchy can be many levels deep, with each level fanning out the streaming content to a greater number of destinations.

Each additional layer that is added to the distribution hierarchy does however come at a cost. The additional layers add latency, potential points of failure, and increase the chance of buffering or breaks experienced by the end user as the streaming content must travel through additional network nodes in order to reach the end user.

One way to reduce load on the origin servers and improve streaming content delivery performance is to configure the distribution servers to cache the streaming content that is retrieved from the origin servers while responding to a first end user's request. The cached copy can then be used to satisfy requests from other users without the distribution server having to retrieve another copy of the streaming content from the origin server. However, caching of all content pertaining to a stream is sometimes impractical because the file size of the entire stream can be very large (e.g., gigabytes). Caching such large objects can cause other objects to be flushed from the distribution server cache, thereby decreasing the distribution server cache-hit ratio and reducing overall distribution server performance when the distribution server is tasked with delivering other content in addition to a particular content stream. In other words, even though the streaming content may be cached, requests for all other content would cause the distribution server to retrieve a fresh copy of the content from a corresponding origin server.

Accordingly, there is a need to improve the delivery of streaming content, especially live or linear content streams, by reducing resource utilization in the distribution hierarchy. There is also a need to reduce load on the origin servers when serving streaming content, especially live or linear content streams, from one or more distribution servers. Specifically, there is a need to reduce the number of end user requests that impact the origin servers. There is also a need to improve distribution server caching of streaming content and reduce per stream cache utilization.

BRIEF DESCRIPTION OF THE DRAWINGS

A preferred embodiment of methods and systems for intelligent predictive caching will now be described, by way of example only, with reference to the accompanying drawings in which.

DETAILED DESCRIPTION

Some embodiments provide intelligent predictive stream caching for improving delivery of streaming content, especially live or linear content streams, across a digital network. In some embodiments, the intelligent predictive stream caching involves streaming content prefetching, segmented caching, and request clustering. Unlike prior art techniques that are limited to prefetching archived or completed content streams (i.e., video-on-demand (VOD) content streams), the intelligent predictive stream caching embodiments presented herein provide prefetching of live or linear streaming content in addition to prefetching of VOD content streams.

Figure 1:
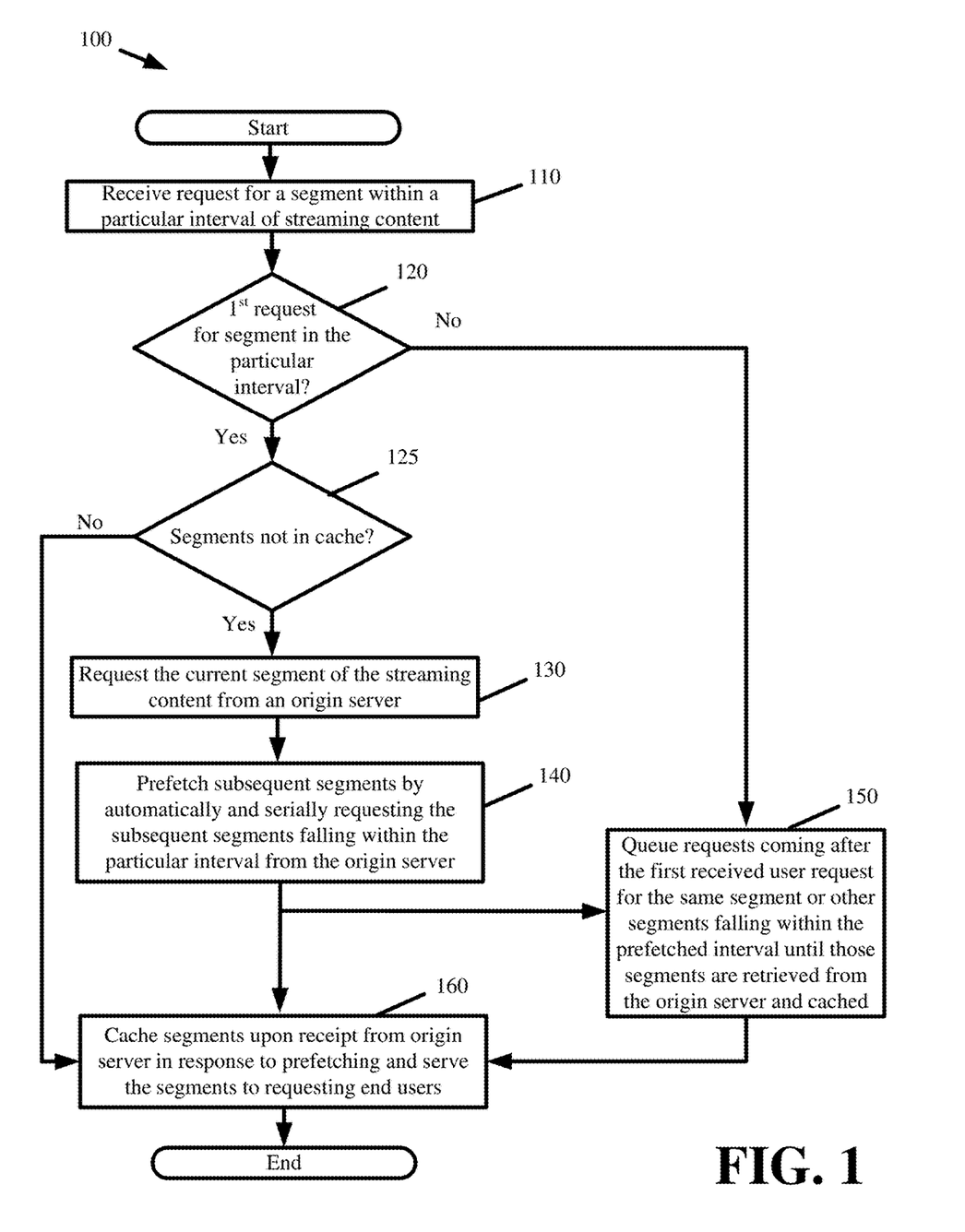
FIG. 1 presents a process for performing content prefetching for live or linear streaming content in accordance with some embodiments.

FIG. 1 presents a process 100 for performing content prefetching for streaming content in accordance with some embodiments. Specifically, process 100 demonstrates prefetching of live or linear streaming content.

Figure 6:
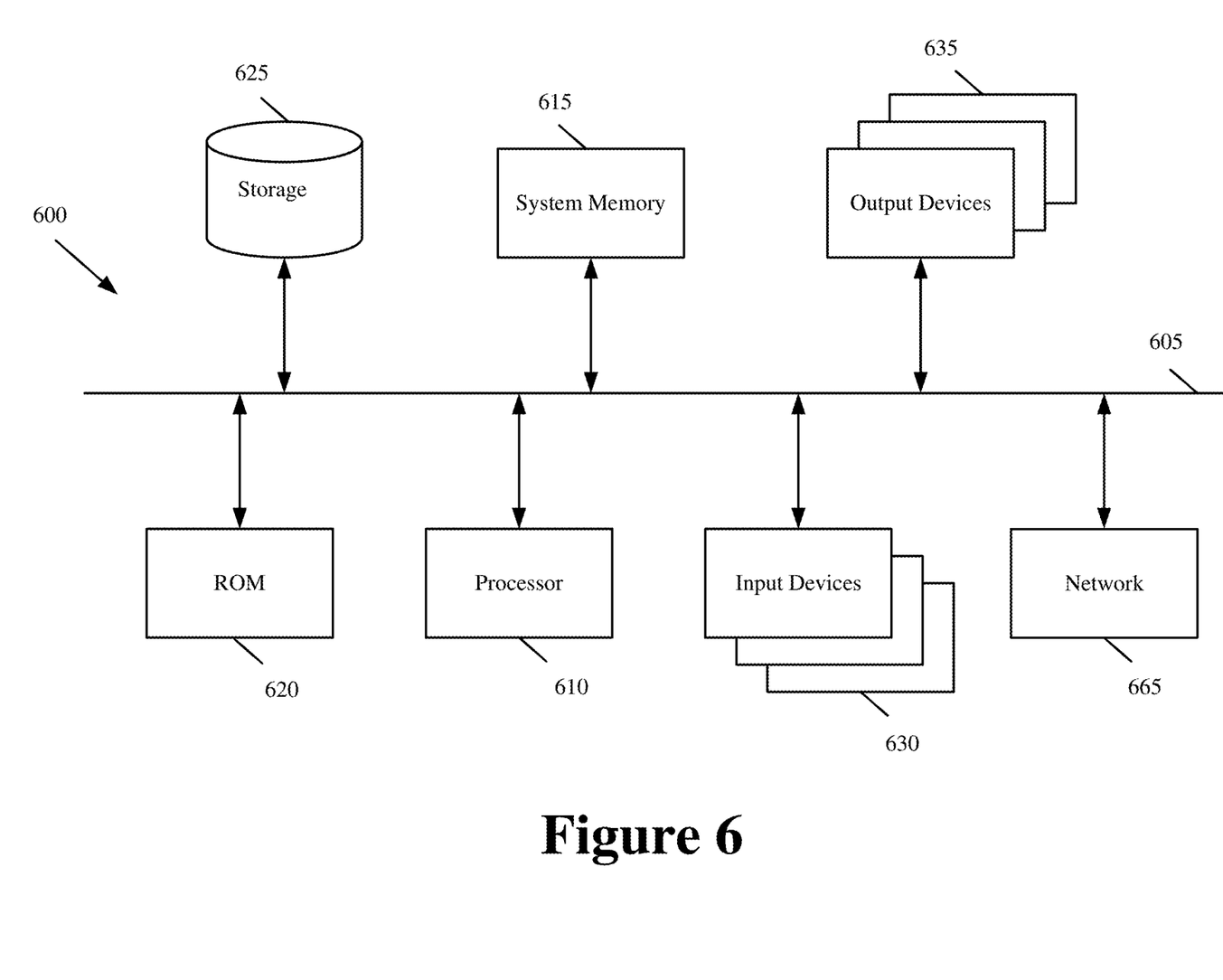
FIG. 6 illustrates a computer system or server with which some embodiments are implemented.

Process 100 is performed by any distribution server. A distribution server is a network accessible machine that receives end user requests for streaming content and is tasked with delivering that streaming content directly to the requesting end users. Commonly, a distribution server is tasked with delivering different streaming content of different content providers or different content or services in conjunction with the delivery of particular streaming content for a particular content provider. Accordingly, the distribution server is not a generalized computer, but rather a specialized machine providing streaming content delivery over a digital network to hundreds, if not thousands, of different end users. FIG. 6 below presents hardware of a distribution server in accordance with some embodiments.

Process 100 commences when the distribution server receives (at 110) a request for a segment within a current prefetch interval of streaming content. A streaming content segment is a packetized or file encoding of a portion of the streaming content. Typically, each segment encodes a few seconds of the streaming content. The request can identify a particular segment by setting a time or byte range that is requested for playback by the end user. The prefetch interval is a recurring window that can be defined in terms of time (e.g., 30 seconds), data/file size (e.g., 10 megabytes), or number of streaming content segments. The prefetch interval is used in partitioning the streaming content for prefetching, segmented caching, and request clustering in accordance with the embodiments described below.

The process determines (at 120) whether the request is the first such request for a segment within the prefetch interval of the particular streaming content. For example, the prefetch interval may be defined to be thirty seconds in length and end user requests to the same or different streaming content segments refers to segments at first, third, fifth, and sixth seconds of the current prefetch interval. In this example, all four requests fall within the same prefetch interval with the request arriving at the beginning of the interval being the first request. Staggered arrival of requests is not uncommon. Requests submitted by different end users can experience different delays and traverse more or less hops to arrive at the distribution server. Accordingly, different end user requests can be for the same streaming content segment even though they arrive within a few milliseconds or seconds of one another. Another reason for the staggered arrival of end user requests is that end users simply commence viewing the streaming content at different times or their devices have different resources pertaining to display resolution, processing power, and network bandwidth.

When the received request is the first request for a segment within the prefetch interval of the streaming content, the process next determines (at 125) if the segment and other segments falling within the prefetch interval have been previously cached. If so, the process responds to the user request by serving (at 160) a cached copy of the requested segment. If the segments are not cached, the process begins prefetching the segments of the streaming content falling within the prefetch interval. For example, when the prefetch interval is defined to be thirty seconds in length, the distribution server prefetches streaming content segments for thirty seconds or prefetches streaming content segments that encode the next thirty seconds worth of the streaming content.

In some embodiments, prefetching involves the distribution server requesting (at 130) the streaming content segment identified in the first request from an origin server. The origin server may be the site where the streaming content is published or ingested or a distribution tier within a multi-tier distribution hierarchy that the distribution server accesses in order to retrieve the streaming content. Once the requested segment is retrieved, it is passed to the requesting end user and contemporaneously cached to fulfill subsequent requests for the same segment. Prefetching further involves the distribution server automatically and serially requesting (at 140) all subsequent segments falling within the prefetch interval and not already in cache from the origin server, prior to receiving any user request for those subsequent segments. When a multi-bit rate content stream is at issue, the distribution server prefetches subsequent segments at the requested bitrate falling within the prefetch interval, but also subsequent segments of at least one higher and lower bitrate. For example, when the distribution server receives a first request for 1 Megabits per second (Mbps) encoding of first segment of a multi-bit content stream encoded at 0.5 Mbps, 1 Mbps, and 1.5 Mbps, the distribution server prefetches second and third segments of the content stream at each of 0.5, 1, and 1.5 Mbps encodings.

If a segment being prefetched is not available at the origin server, the distribution server retries the request for that segment for a preset duration until the segment becomes available or the preset duration expires. The distribution server may wait some timeout interval (e.g., a few milliseconds) or for a segment not available response from the origin server before resubmitting the request. This retry operation is directed to prefetching live or linear streaming content segments as a segment of live or linear streaming content being prefetched may not be available if the request is submitted before the origin server receives the segment from the publishing entity. For example, in prefetching a live or linear HTTP Smooth Streaming (HSS) content stream, the requesting server may receive a HyperText Transfer Protocol (HTTP) status code 412 when the requested segment is valid, but not yet available at the origin server. The distribution server which has received the end user request will retry to fetch the segment from the origin server for a maximum preset duration (also called retry interval) equal to the segment length (typically 2 seconds). If the distribution server fails to retrieve the segment within the retry interval, then it will return the response received from the origin server to the end user. The duration between consecutive retries may either be a predetermined value (typically in the range of 10 to 20 ms) or is equal to the round trip time which is the sum total of the time taken for a request from the distribution server to reach the origin server and for the response from the origin server to reach the requesting distribution server.

Contemporaneous with the prefetching operations, the process performs request clustering. Request clustering involves temporarily queuing (at 150) or buffering any requests that come after the first received user request for the same segment or other segments falling within the prefetched interval until those segments are retrieved from the origin server.

Prefetching continues until all segments for the current streaming content prefetch interval have been retrieved or the requesting server has failed to retrieve a segment from the origin server after retrying for the preset duration. Each prefetched segment is cached (at 160) upon receipt from the origin server and is also contemporaneously served to any end users having requested that segment.

As part of request clustering introduced above, in cases when a received request is not the first request for a segment in a particular prefetch interval, the prefetching process will have already commenced in response to the first received request. Accordingly, it is likely that the segment being requested has already been prefetched and is locally cached within the distribution server memory. When cached, the process responds to the user request by serving the requested segment from cache without initiating a request to the origin server. There may be instances when prefetching has commenced in response to a first request, but a second request is received prior to receiving the prefetched segments from the origin server. In such cases, request clustering stops the distribution server from retrieving redundant copies of the same segment from the origin server by initiating a new connection and submitting a new request for the segment when the segment is already being prefetched. Instead, the distribution server intelligently determines that prefetching of the requested segments has already commenced in response to an earlier received request from a different end user. The distribution server periodically checks the cache to determine whether the requested segment has become available in cache. Once the requested segment is located in cache, the distribution server responds to the user request by serving the segment from cache without initiating any further connections or submitting any additional requests from different end users to the origin server.

Once all the segments within the particular prefetch interval are retrieved and cached, the process stops prefetching and awaits a first user request for a next segment before once again prefetching segments for the next prefetch interval. The prefetch interval ensures that the distribution server does not unnecessarily retrieve the entirety of the streaming content if all users stop watching after some period of time.

The prefetch interval also enables segmented caching. As part of segmented caching, the distribution server performing process 100 does not cache the entirety of the streaming content. Instead, the distribution server caches the segments falling within the prefetch interval. By caching streaming content segments falling within the prefetch interval, the distribution server preserves its cache-hit ratio by ensuring that other objects in cache are not flushed. Stated differently, the segmented caching allows the distribution server to cache different portions of the streaming content while overwriting older portions in cache so that the server cache is not disproportionately allocated to one content stream or one file. When a first request for a segment falling within a next or another prefetch interval is received, the distribution server can restart process 100 as well as discard or delete the cached segments from a previous prefetch interval.

It should be noted that the end user submitting the first request in each prefetch interval suffers a delay that would not be experienced if the distribution server were to cache the entirety of the streaming content, especially in the case of VOD content. However, the effect on the server cache and the overall performance degradation suffered by the distribution server caching the entirety of the streaming content at the cost of caching other objects is far more significant than one end user experiencing delay at the start of each prefetch delay. All other requests issued after the first request within the same prefetch interval still receive the prefetching and segmented caching benefit provided by some embodiments. For popular streaming content viewed by several hundreds or thousands of end users, the delay is insignificant as it affects a small fractional percentage of the overall viewing population and it is further likely that the delay at the start of each prefetch interval is experienced by different end users as each prefetch interval is likely to be commenced by a request from a different end user. In summary, the provided embodiments realize the benefit of live or linear streaming content prefetching and caching by partitioning streaming content and treating it as small cacheable objects that do not adversely affect server cache-hit ratio and do not disproportionately consume server cache relative to other cacheable objects.

The embodiments also improve server efficiency and capacity. The request clustering allows the distribution server to satisfy all end user requests for streaming content segments with only one origin server access in each prefetch interval. As a result, the distribution server has much fewer connections and exchanges with the origin server than if each streaming content request was treated independently as is done in the prior art. Also, the distribution server can allocate the resources it would have otherwise had to dedicate for streaming content retrieval to streaming content distribution, thereby allowing the distribution server to handle and respond to more streaming content requests at any given moment. The load on the origin server is also greatly reduced as a result of the fewer connections and requests originating from the distribution server. The origin server can serve more distribution servers. This, in turn, greatly simplifies the streaming content distribution hierarchy by reducing the number of caching tiers and distribution servers needed to stream content from the origin server to different end users. By reducing the number of caching tiers separating the streaming content consuming end users from the origin server, the provided embodiments reduce the total overall latency for serving streaming content to end users. There are fewer nodes that the streaming content has to traverse in order to reach the end users. The intelligent predictive stream caching of some embodiments allows end users to receive their requested streaming content faster, with less buffering, fewer potential points of network failure, etc.

Figure 2:
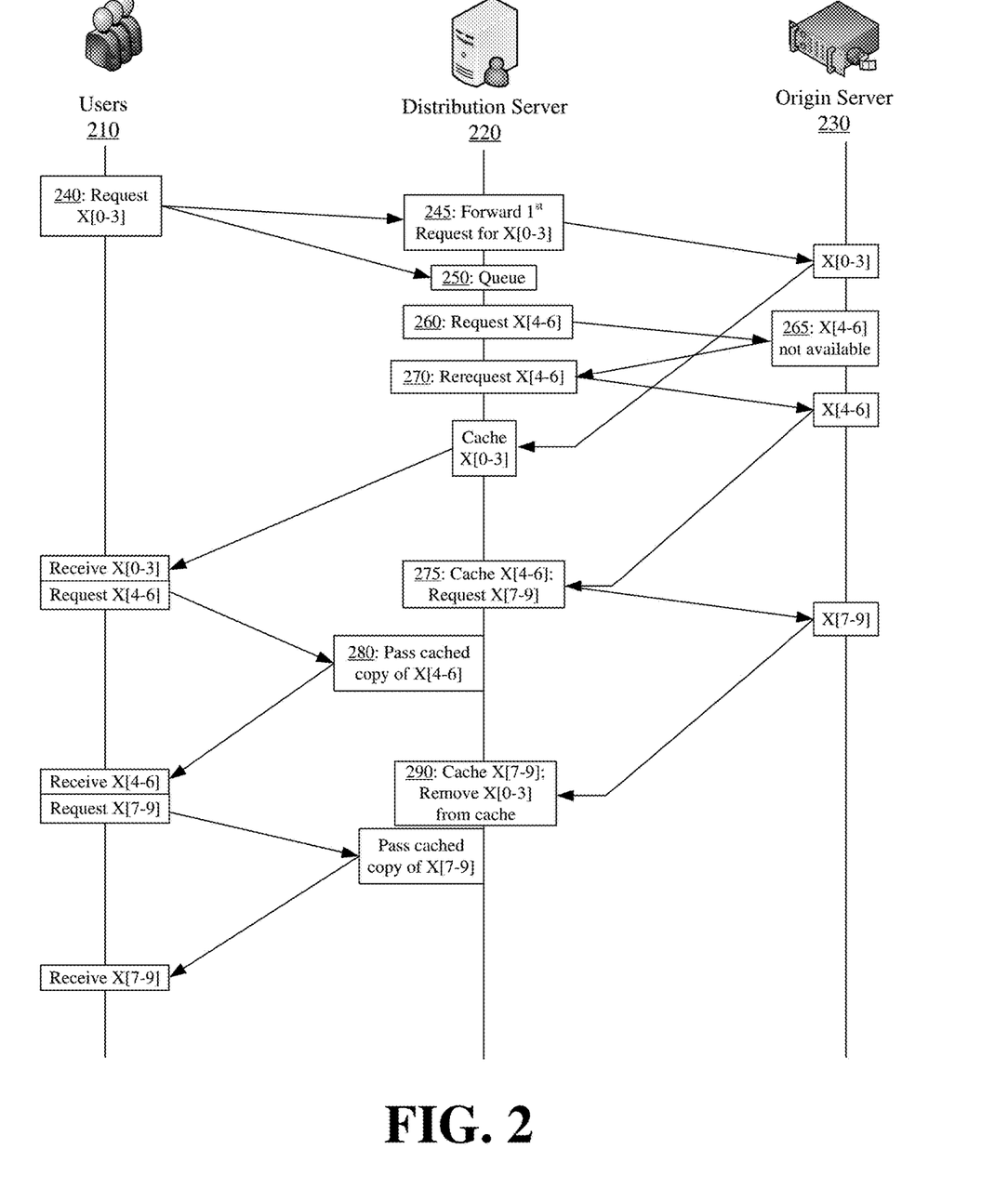
FIG. 2 illustrates performing intelligent predictive stream caching in accordance with some embodiments.

FIG. 2 illustrates performing intelligent predictive stream caching in accordance with some embodiments. The figure illustrates two or more users 210, a distribution server 220, and an origin server 230. The distribution server 220 performs intelligent predictive stream caching by implementing process 100 above.

Users 210 submit requests for the same live or linear streaming content to the distribution server 220. The user requests arrive in a staggered manner. As shown, a first user request arrives at 240 and a second user request for the same first segment arrives shortly thereafter at 250. The staggered arrival can be due to network congestion, device capabilities, or when the different users 210 began watching the streaming content.

Upon receiving the first streaming content request at 240, the distribution server immediately forwards the request to the origin server at 245. Since the second user request for the same first segment arrives after the first user request, the distribution server performs request clustering and queues at 250 the second request without initiating a new connection or request to the origin server 230.

Contemporaneous with forwarding the first user 210 request for the first or current streaming content segment, the distribution server 220 begins prefetching subsequent streaming content segments falling within the prefetch interval in advance of any end user requesting those segments from the distribution server 220. The prefetching commences at 260 when the distribution server 220 submits a request for the second streaming content segment before the second segment is requested by any of the users 210. The origin server 230 responds by indicating that the second segment is not available at 265. The distribution server then retries and reissues the second segment request at 270. By the time the origin server 230 receives the second segment second request, the origin server 230 has acquired the segment from the content publisher and has it available for distribution. Accordingly, the origin server 230 passes the second segment to the distribution server 220 in response to the second request. The distribution server 220 caches the second segment at 275 even though users 210 have not yet requested that segment. The distribution server 220 immediately begins prefetching the third segment that falls within the same prefetch interval as the first request for the first segment received and forwarded at 245.

A short time after caching the second segment, the distribution server 220 receives a first user request for the prefetched second segment. The distribution server 220 is able to serve the second segment in much less time than the time needed to serve the first segment because of the prefetching. A copy of the second segment already resides in cache. Accordingly, the distribution server 220 avoids the round trip time to retrieve the second segment from the origin server 230. In response to the second segment user request, the distribution server 220 immediately passes at 280 the requested second segment from cache.

The distribution server 220 prefetches and caches the streaming content third segment at 290. Here again, the prefetching occurs in advance of receiving any user 210 request for the third segment. At 290, the distribution server 220 may also remove the cached copy of the first segment from cache or overwrite the first segment in cache with the third segment. This illustrates one benefit of the segmented caching of some embodiments, whereby the distribution server 220 cache is not disproportionately consumed by the streaming content and the cache only maintains copies of temporally relevant segments of the streaming content. In some embodiments, the distribution server 220 does not purge the second segment while prefetching the third segment because the distribution server 220 may still receive user 210 requests for the second segment while prefetching the third segment. Another benefit of the segmented caching is that after only a single retrieval of each segment from the origin server 230, the distribution server 220 is able to respond to requests from multiple users 210 without overly dedicating the server cache to the streaming content.

Figure 3:
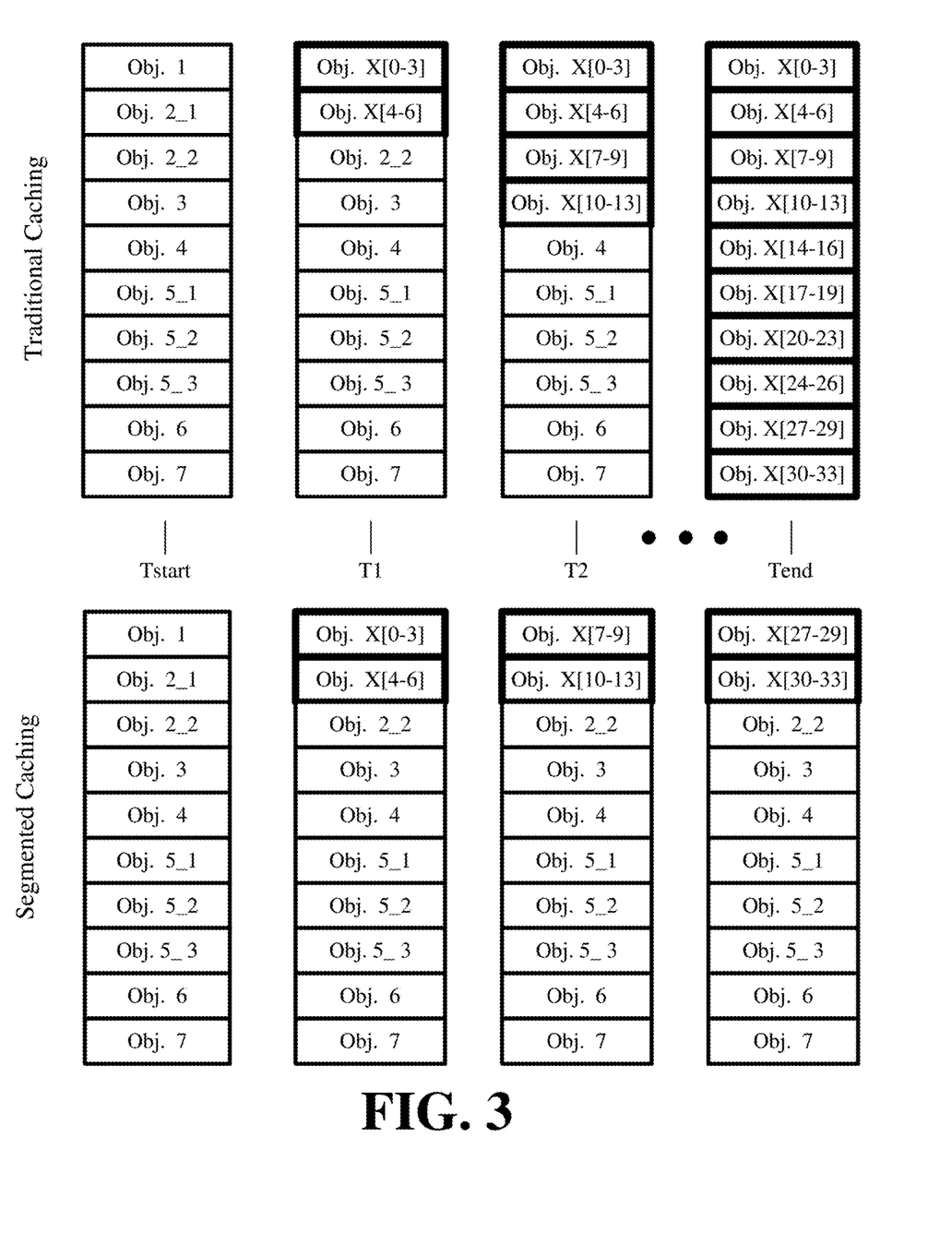
FIG. 3 depicts distribution server cache utilization when performing traditional caching versus segmented caching in accordance with some embodiments.

To better illustrate the benefits of segmented caching, FIG. 3 depicts distribution server cache utilization when performing traditional caching versus segmented caching in accordance with some embodiments. Traditional caching is displayed at the top of the figure and segmented caching is displayed at the bottom of the figure. The distribution server cache is conceptually illustrated as being partitioned into ten slots. Each slot caches a different object or a different part of an object. The objects represent different cached content, services, or streaming content segments.

In traditional caching, as the distribution server serves segments of a particular content stream in response to user requests, each segment gets stored in cache. Over time, the particular content stream consumes more and more of the overall cache footprint which results in more and more of the other cached objects being ejected from cache. Should requests come in for the previously cached objects, the requests will result in a cache miss, thereby forcing the distribution server to retrieve those objects from their corresponding origin.

As part of the segmented caching of some embodiments, only a portion of the distribution server cache needed to store the prefetched interval is consumed. In this figure, two caching slots are consumed in caching the segments for each prefetched interval. The rest of the distribution server cache remains unaffected, thereby preserving the server's cache hit ratio. The two slots are overwritten whenever the next interval is prefetched. For instance, at time T1, the two caching slots store 0-6 seconds of the particular content stream, then at time T2, the two caching slots are overwritten to store 7-13 seconds of the particular content stream.

Thus far, the intelligent predictive stream caching has been described relative to a single distribution server implementation. Some embodiments expand the intelligent predictive stream caching for application in a multi-distribution server implementation. In some such embodiments, a set of distribution servers are tasked with distributing the same streaming content to different sets of end users. Rather than have each distribution server retrieve and prefetch copies of streaming content segments from the origin server, the multi-distribution server implementation provides for cross-server retrieval and prefetching. In some embodiments, the first distribution server to retrieve a streaming content segment redistributes the segment to any end user requesting the segment from that distribution server, but also to the other distribution servers performing intelligent predictive stream caching. In doing so, the other distribution servers do not place any additional load on the origin server and the other distribution servers can prefetch the streaming content from the first distribution server prior to or contemporaneous with user issued requests for the streaming content.

Figure 4:
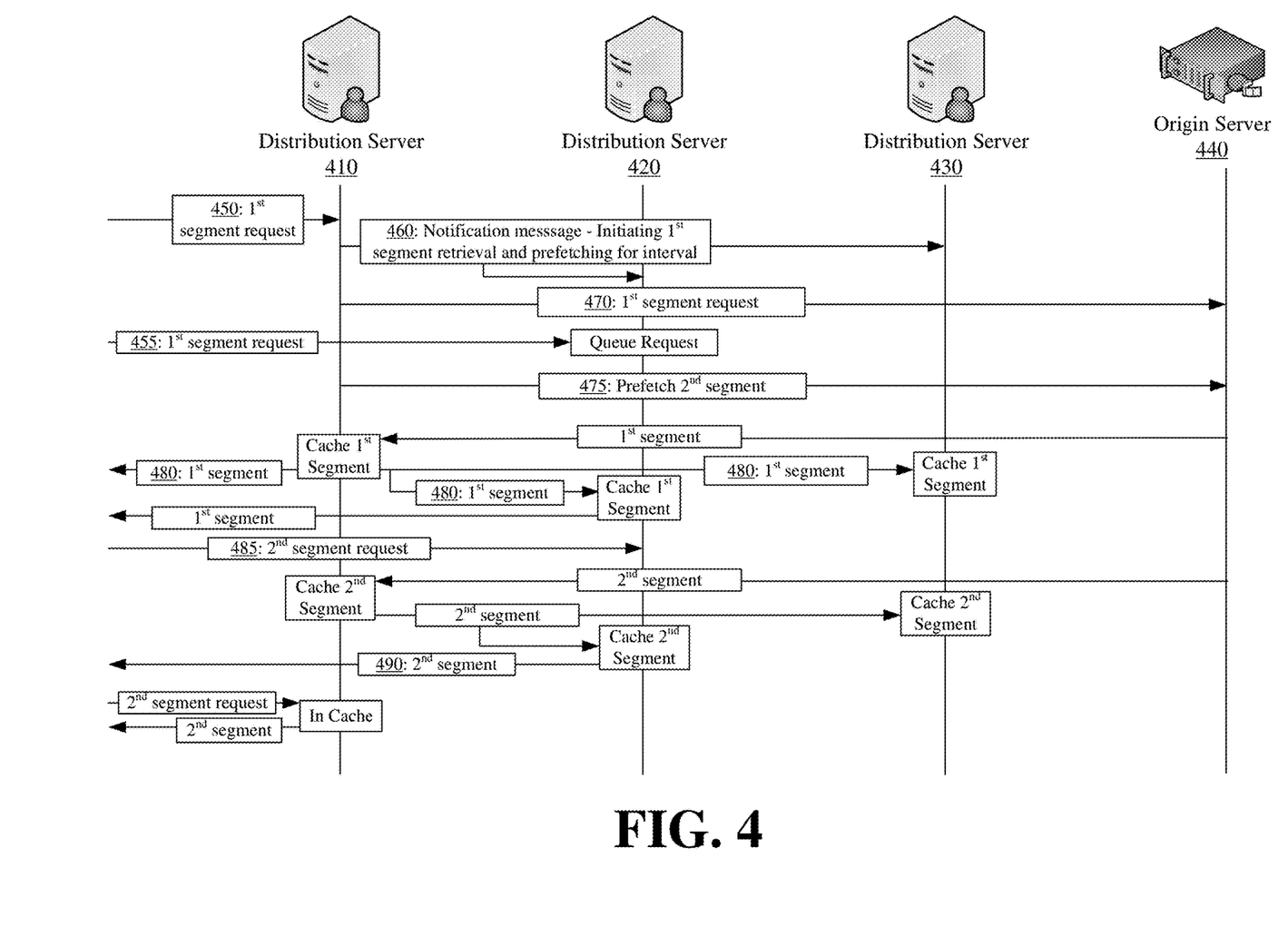
FIG. 4 presents a messaging diagram illustrating operation of intelligent predictive stream caching in a multi-distribution server environment.

FIG. 4 presents a messaging diagram illustrating operation of intelligent predictive stream caching in a multi-distribution server environment. The figure illustrates three distribution servers 410, 420, and 430 and an origin server 440. The three distribution servers 410, 420, and 430 are tasked with delivering the same live or linear streaming content to different sets of end users.

A content delivery network (CDN) or any cloud based content provider is representative of such a multi-distribution server environment. In a CDN, different distribution servers are deployed to different points-of-presence (PoP). Each PoP optimizes streaming content delivery to a different set of end users. Optimization can be based on geographic proximity, whereby each PoP distributes the streaming content to end users that are geographically closest to the PoP.

The first distribution server 410 is the first of the three distribution servers 410, 420, and 430 to receive (at 450) an end user request for a first segment of streaming content during a particular interval. The first distribution server 410 identifies itself as the first to receive a streaming content segment request for a particular interval by notifying (at 460) the other distribution servers 420 and 430. The notification message may include a timestamp specifying when the first distribution server 410 received the request in the event that another distribution server also receives a request and attempts to notify the other distribution servers before receiving the first distribution server's notification message. In any case, the notification message with the earliest timestamp identifies the distribution server that first receives the streaming content request. Upon receiving the notification message from a first distribution server, the other distribution servers perform request clustering for all requests received subsequent to the notification message in the prefetch interval.

Simultaneous or contemporaneous with sending the notification message, the first distribution server 410 requests (at 470) the first segment from the origin server 440 and begins serially prefetching (at 475) subsequent streaming content segments that fall within the defined prefetch interval from the origin server 440. In this scenario, the prefetching occurs in advance of any of the distribution servers 410, 420, and 430 receiving requests for the subsequent segments within the prefetch interval.

When the first distribution server 410 receives the requested streaming content first segment, the first distribution server 410 caches the segment and passes (at 480) the first segment to the requesting end user as well as the other distribution servers 420 and 430 tasked with serving the same live or linear streaming content. The distribution servers 420 and 430 also cache the segment upon receipt from the first distribution 410 so that they have their own local cached copy of the segment which can be used to directly respond to any incoming requests for that segment.

Similarly, any segments that the first distribution server 410 prefetches from the origin server 440 during the particular prefetch interval are also automatically redistributed from the first distribution server 410 to the other distribution servers 420 and 430 for local caching therein. In summary, the first distribution server to receive a streaming segment request retrieves that segment and begins prefetching subsequent segments not only for itself, but also for other distribution servers collectively performing multi-distribution server intelligent predictive stream caching in accordance with some embodiments.

The benefit of this shared prefetching is demonstrated in FIG. 4. At 485, the second distribution server 420 receives a request for the streaming content second segment. The request arrives after the first distribution server 410 notification message. Accordingly, the second distribution server 420 is aware that the first distribution server 410 has already commenced prefetching the second segment. The second distribution server 420 queues the request until the first distribution server 410 provides a copy of the second segment that the second distribution server 420 caches and serves to the requesting end user at 490. The prefetching by the first distribution server 410 allows the second distribution server 420 to respond much more quickly to the second segment request. First, the second distribution server 420 avoids the delay associated with requesting the second segment from the origin server 440 or any other distribution server 410 and 430. The second distribution server 420 receives the second segment from the first distribution server 410 without having to request the segment as a result of the prefetching. Accordingly, half of the round trip time to retrieve the segment is eliminated. Moreover, even if the second distribution server 420 was to perform its own prefetching in response to the first segment request it received at 455, there would be added delay because the second distribution server 420 receives the first segment request after the first distribution server 410 and would therefore being prefetching at a later time.

By having one distribution server perform prefetching for all distribution servers, this implementation greatly reduces load on the origin server 440. Rather than respond to requests and distribute the segments to each distribution server 410, 420, and 430 independently, the origin server 440 now only responds and distributes the segments to one of the three distribution servers which then redistributes the segments to the other distribution servers.

Rather than replicate copies of streaming content segments in different distribution server caches, some embodiments redirect requests for a particular segment received at different distribution servers to a particular distribution server having a cached copy of the particular segment. Accordingly, the particular distribution server can respond to all requests for the particular segment and serve the particular segment from a single cached instance of the segment. This implementation also extends to prefetched segments.

For example, when a first distribution server prefetches first, second, and third streaming content segments, the first distribution server may notify second and third distribution servers that the first distribution server has prefetched the segments, rather than distribute copies of the segments to the second and third distribution servers. Upon receiving the first distribution server notification, the second and third distribution servers redirect any subsequent requests for the first, second, or third segments that they receive to the first distribution server. The first distribution server then responds to each request by serving the requested content from cache.

Figure 5:
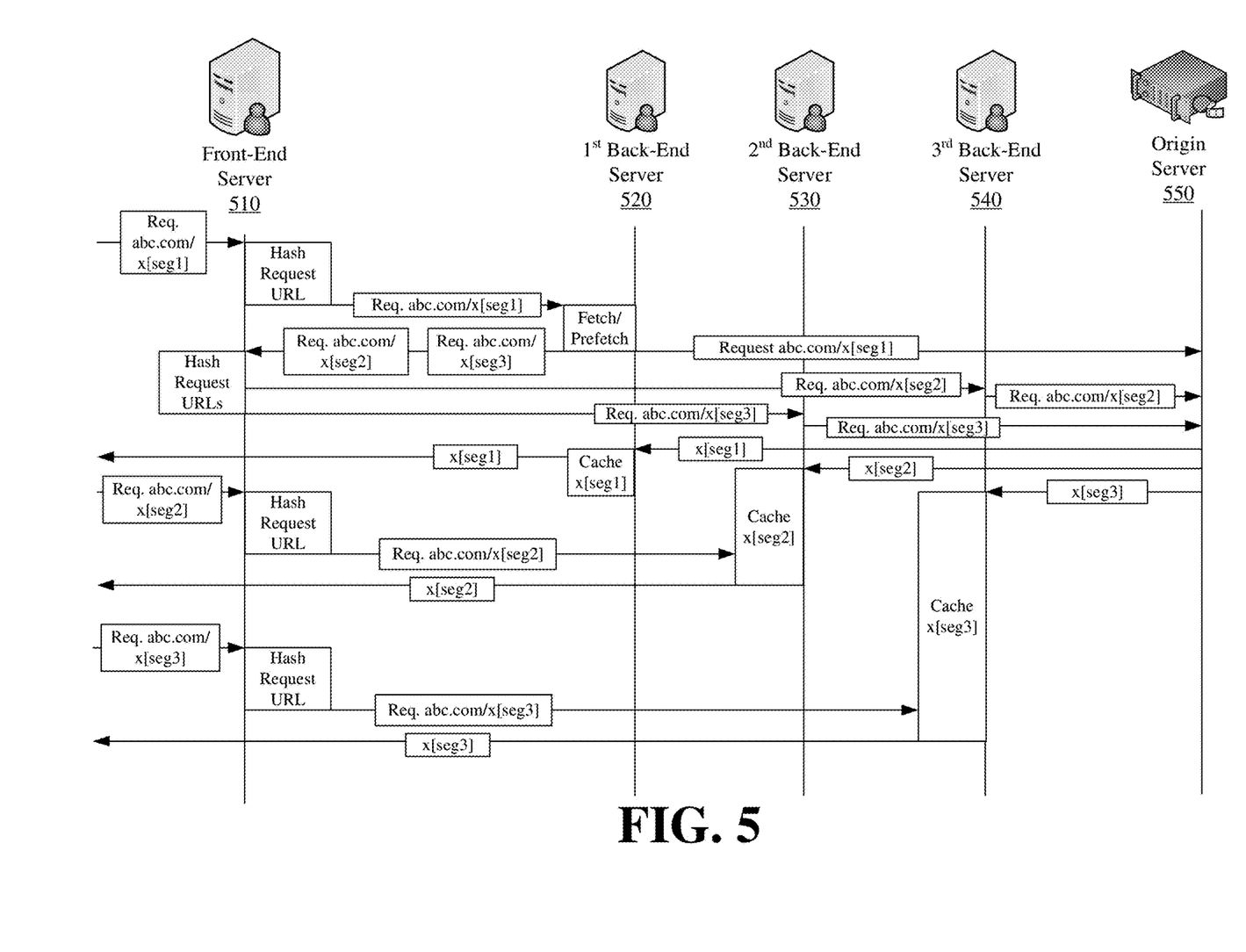
FIG. 5 illustrates distributed prefetching in accordance with some embodiments.

Some other embodiments leverage a front-end and back-end caching architecture for distributed prefetching in which one distribution server initiates prefetching for multiple server. FIG. 5 illustrates distributed prefetching in accordance with some embodiments. The figure depicts operation of a front-end server 510, a first back-end server 520, a second back-end server 530, a third back-end server 540, and an origin server 550.

The front-end server 510 performs a consistent request distribution such that requests for the same particular segment are forwarded to the same back-end server. In this figure, each of the back-end servers 520, 530, and 540 is tasked with serving different segments of a particular content stream.

A first end user request is received at the front-end server 510. Using a consistent distribution scheme, such as the Cache Array Routing Protocol (CARP), the front-end server 510 hashes one or more features of the request (e.g., the Uniform Resource Locator (URL)) and identifies the first back-end server 520 as the server tasked with distributing the first segment of the particular content stream. Accordingly, the front-end server 510 passes the end user request to the first back-end server 520.

In addition to retrieving the first segment from the origin server 550, the first back-end server 520 also initiates prefetching of second and third segments of the particular content stream. Specifically, the first back-end server 520 initiates a new request for prefetching each of the second and third segments. The first back-end server 520 passes the prefetching requests back to the front-end server 510.

The front-end server 510 then distributes the requests to the appropriate back-end servers 530 and 540. As shown, the second back-end server 530 receives from the front-end server 510, the request for prefetching a second segment and the third back-end server 540 receives from the front-end server 510, the request for prefetching a third segment.

The second back-end server 530 then retrieves and caches the second segment from the origin server 550. The third back-end server 540 retrieves and caches the third segment from the origin server 550.

Per the consistent request distribution, the front-end server 510 then forwards all subsequent end user requests for the second segment to the second back-end server 530 and the third segment to the third back-end server 540. Each server then responds to the requests with cached copies of the segment obtained as a result of the prefetching initiated by the first back-end server 520.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

FIG. 6 illustrates a computer system or server with which some embodiments are implemented. Such a computer system includes various types of computer-readable mediums and interfaces for various other types of computer-readable mediums that implement the various methods and machines described above (e.g., distribution server). Computer system 600 includes a bus 605, a processor 610, a system memory 615, a read-only memory 620, a permanent storage device 625, input devices 630, and output devices 635.

The bus 605 collectively represents all system, peripheral, and chipset buses that communicatively connect the numerous internal devices of the computer system 600. For instance, the bus 605 communicatively connects the processor 610 with the read-only memory 620, the system memory 615, and the permanent storage device 625. From these various memory units, the processor 610 retrieves instructions to execute and data to process in order to execute the processes of the invention. The processor 610 is a processing device such as a central processing unit, integrated circuit, graphical processing unit, etc.

The read-only-memory (ROM) 620 stores static data and instructions that are needed by the processor 610 and other modules of the computer system. The permanent storage device 625, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 625.

Other embodiments use a removable storage device (such as a flash drive) as the permanent storage device Like the permanent storage device 625, the system memory 615 is a read-and-write memory device. However, unlike storage device 625, the system memory is a volatile read-and-write memory, such as random access memory (RAM). The system memory stores some of the instructions and data that the processor needs at runtime. In some embodiments, the processes are stored in the system memory 615, the permanent storage device 625, and/or the read-only memory 620.

The bus 605 also connects to the input and output devices 630 and 635. The input devices enable the user to communicate information and select commands to the computer system. The input devices 630 include alphanumeric keypads (including physical keyboards and touchscreen keyboards), pointing devices. The input devices 630 also include audio input devices (e.g., microphones, MIDI musical instruments, etc.). The output devices 635 display images generated by the computer system. The output devices include printers and display devices, such as cathode ray tubes (CRT) or liquid crystal displays (LCD).

Finally, as shown in FIG. 6, bus 605 also couples computer 600 to a network 665 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 600 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
    receiving a client request for a first segment of streaming content at a streaming server, wherein the streaming content is published to a different origin server;
    submitting a set of requests for the first segment and at least a subsequent second segment of the streaming content from the streaming server to the origin server in response to said receiving the client request for the first segment;
    receiving the first segment at the streaming server from the origin server in response to said submitting occurring after the first segment is published to the origin server and before the second segment is published to the origin server;
    detecting at the streaming server, that the second segment has not been published to the origin server based on said submitting of the set of requests and said receiving the first segment without the second segment;
    reissuing a subset of the set of requests for at least the second segment from the streaming server to the origin server before receiving a client request for the second segment at the streaming server;
    receiving the second segment at the streaming server from the origin server in response to said reissuing occurring after the second segment is published to the origin server;
    receiving a client request for the second segment at the streaming server; and
    serving the second segment from the streaming server in response to the client request for the second segment.

2. The method of claim 1, wherein said submitting comprises establishing a single network connection between the streaming server and the origin server in response to said receiving the client request for the first segment, and sending the set of requests over the single network connection after said establishing.

3. The method of claim 2, wherein said reissuing comprises reusing the single network connection from said establishing, and sending the subset of requests over the single network connection.

4. The method of claim 1 further comprising determining a duration of at least the first segment in response to said receiving the first segment.

5. The method of claim 4, wherein said detecting comprises waiting said duration after said submitting, and wherein said reissuing comprises sending the subset of requests in response to not receiving the second segment during said waiting.

6. The method of claim 1, wherein the streaming server is a first streaming server, and wherein said submitting comprises notifying at least a different second streaming server about prefetching of at least the second segment by the first streaming server.

7. The method of claim 6 further comprising receiving a client request for the second segment at the second streaming server after said notifying, and queuing the client request for the second segment at the second streaming server while awaiting retrieval of the second segment by the first streaming server in response to said notifying.

8. The method of claim 7 further comprising passing the second segment from the first streaming server to the second streaming server after said receiving the second segment by the first streaming server.

9. The method of claim 8 further comprising serving the second segment from the second streaming server in response to said passing the second segment and the second streaming server receiving the second segment from the first streaming server.

10. The method of claim 6 further comprising distributing the second segment from the first streaming server to the second streaming server in response to said receiving the second segment by the first streaming server and before receiving a client request for the second segment at the first streaming server or the second streaming server.

11. The method of claim 1, wherein said reissuing comprises resending a first prefetch request for the second segment at a first bitrate to the origin server, and resending a second prefetch request for the second segment at a different second bitrate to the origin server.

12. The method of claim 1, wherein said detecting comprises receiving an HyperText Transfer Protocol (HTTP) message, with a status code indicating that the second segment is not yet available at the origin server, contemporaneously with said receiving the first segment.

13. A method for prefetching stream segments, the method comprising:
receiving a client request for a first segment of streaming content at a first streaming server;
submitting a set of requests from the first streaming server to an origin server at which the streaming content is published, wherein the set of requests comprises a first request for the first segment and a second prefetch request for a second segment of the streaming content, wherein the second prefetch request is submitted prior to the first streaming server receiving a client request for the second segment;
notifying at least a second streaming server by the first streaming server of said submitting of the set of requests by the first streaming server;
receiving a client request for the second segment at the second streaming server;
queuing the client request for the second segment at the second streaming server based on said notifying by the first streaming server;
distributing at least the second segment from the first streaming server to the second streaming server upon receipt of the second segment from the origin server; and
responding to the client request for the second segment from the second streaming server by providing the second segment received as a result of said distributing.

14. The method of claim 13 further comprising receiving a client request for a third segment at the second streaming server, and submitting a second set of requests from the second streaming server to the origin server before receiving any notification from another streaming server about retrieval of said third segment, wherein the second set of requests comprises a request for the third segment and a prefetch request for a fourth segment of the streaming content, wherein the prefetch request for the fourth segment is submitted prior to the second streaming server receiving a client request for the fourth segment.

15. The method of claim 14 further comprising notifying at least the first streaming server by the second streaming server of said submitting of the second set of requests by the second streaming server.

16. The method of claim 15 further comprising distributing the third and fourth segments from the second streaming server to the first streaming server upon receipt of the third and fourth segments from the origin server at the second streaming server.

17. A device comprising:
a non-transitory computer-readable medium storing a set of processor-executable instructions; and
one or more processors configured to execute the set of processor-executable instructions, wherein executing the set of processor-executable instructions causes the one or more processors to:
receive a client request for a first segment of streaming content, wherein the streaming content is published to an origin server;
submit a set of requests for the first segment and at least a subsequent second segment of the streaming content to the origin server in response to said receiving the client request for the first segment;
receive the first segment at the device from the origin server in response to said submitting occurring after the first segment is published to the origin server and before the second segment is published to the origin server;
detect that the second segment has not been published to the origin server based on said submitting of the set of requests and said receiving the first segment without the second segment;
reissue a subset of the set of requests for at least the second segment to the origin server before receiving a client request for the second segment at the device;
receive the second segment from the origin server in response to said reissuing occurring after the second segment is published to the origin server;
receive a client request for the second segment; and
serve the second segment in response to the client request for the second segment.

* * * * *